J. D. LOUDEN.
SPRING CENTERING ATTACHMENT FOR AUTOMOBILE STEERING APPARATUS.
APPLICATION FILED MAR. 5, 1919.
1,335,064.   Patented Mar. 30, 1920.
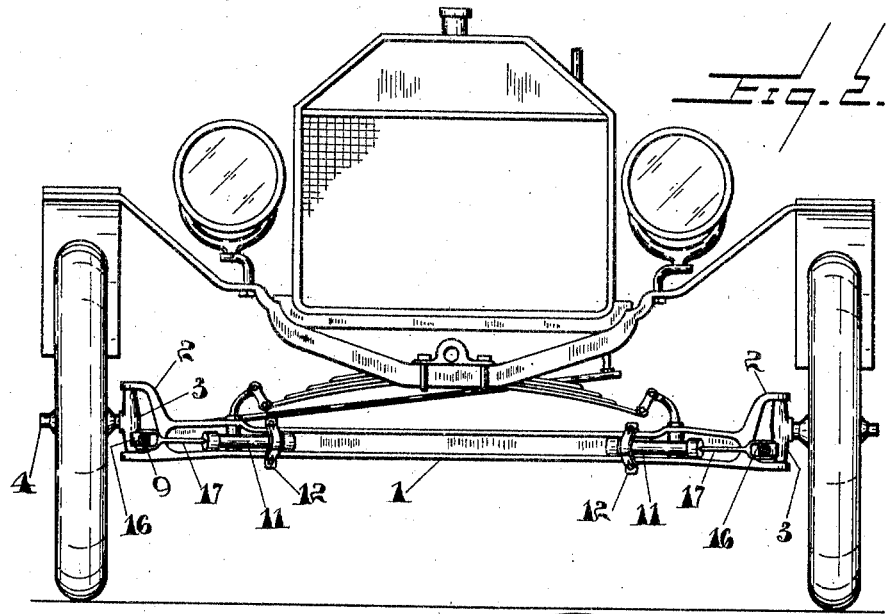
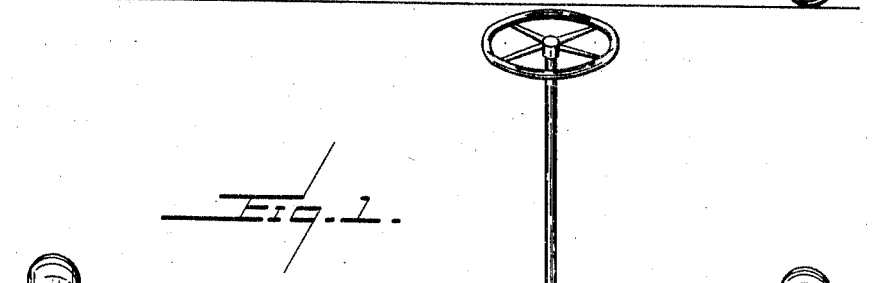
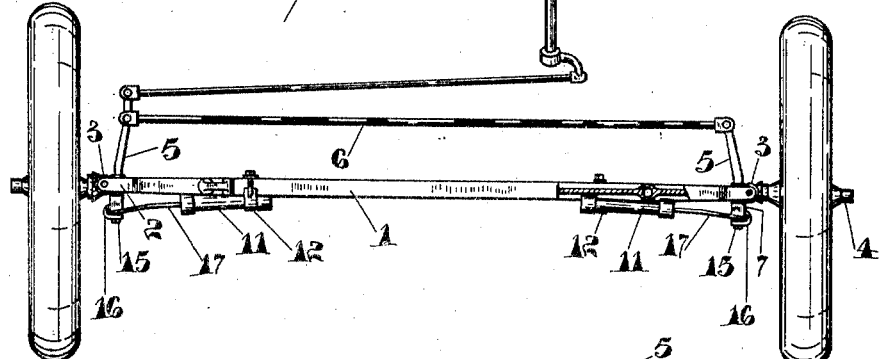
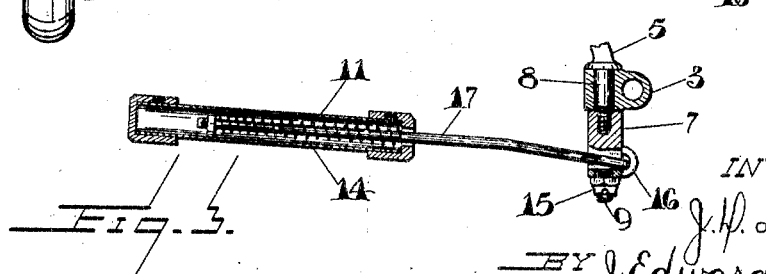
INVENTOR.
J. D. Loudon.
BY J. Edward Maybee.
ATTY.

UNITED STATES PATENT OFFICE.

JONATHAN D. LOUDEN, OF TORONTO, ONTARIO, CANADA, ASSIGNOR TO JOHN THOMAS WIGGINS, OF TORONTO, CANADA.

SPRING CENTERING ATTACHMENT FOR AUTOMOBILE STEERING APPARATUS.

1,335,064.     Specification of Letters Patent.     Patented Mar. 30, 1920.

Application filed March 5, 1919. Serial No. 280,716.

*To all whom it may concern:*

Be it known that I, JONATHAN DAVID LOUDEN, of the city of Toronto, in the county of York, Province of Ontario, Canada, have invented certain new and useful Improvements in Spring Centering Attachments for Automobile Steering Apparatus, of which the following is a specification.

In certain types of steering apparatus for automobiles which do not employ worm gears considerable difficulty is experienced in keeping the car straight when road conditions are such that strains are imparted to the wheels tending to throw them from their normal positions, and my object is to provide spring means tending to maintain the wheels in normal position, which will take up lost motion in the steering apparatus, and which, if breakage occurs in the steering connections of a wheel, will tend to turn the wheel inward and thus avoid the ditching of the car.

I attain my objects by means of the constructions hereinafter described and illustrated in the accompanying drawings in which Figure 1 is a plan view of the front axle of an automobile with its steering attachments;

Fig. 2 a front elevation of the same showing also part of the motor car; and

Fig. 3 a sectional detail of parts of the same.

In the drawings like numerals of reference indicate corresponding parts in the different figures.

1 is the front axle, which is provided with forked bearings 2 at each end for the steering spindles 3, each of which carries a stub axle or journal 4 for a wheel. 5 are the steering arms connected by the connecting rod 6, which is actuated in any suitable manner from the steering wheel of the automobile.

In the type of motor car for which this attachment is specially devised, each steering arm 5 has an end 8 passing through the steering spindle and threaded at its end to receive a nut which secures the arm in place. I take advantage of this construction and remove the nuts and screw on to each end 8 a short arm 7 which has an interiorly threaded hole formed therein for that purpose. These arms have each a threaded stud 9 formed thereon on to which may be screwed the nuts 15 which ordinarily are screwed on the ends 8. The nuts secure in place the clips 16 each of which has a curved end forming a loop behind its arm 7.

11 are cylinders suitably secured to the axle. Preferably by means of clips 12 so that the cylinders are adjustable longitudinally of the axle.

A plunger rod 17 extends through the end of each cylinder and is looped to embrace one of the arms 7 being held in place by the clip 16.

A coil spring 14 is placed on each plunger rod and engages the end of the cylinder and a washer secured on the rod. A spring tension is thus applied to each wheel tending to turn it inwardly, and therefore as neither wheel can turn outwardly without compressing the spring connected therewith, the wheels tend to run straight, assuming that the tension of each spring has been properly adjusted.

In operation several important advantages are attained by my construction. The springs take up any lost motion in the steering connections so that instant response is obtained to any movement of the steering wheel. If the steering connections at one side happen to break, the wheel is pulled inwardly instead of being left free to swing outwardly as it naturally tends to do, and consequently the car is kept on the road until the driver regains control with the remaining wheel. If the automobile equipped with this apparatus encounters road conditions tending to throw the wheels from their normal position, the springs tend to resist the strains imparted to the wheels, and to retain them in normal position. That this is the case will be evident when it is considered that the swinging of the wheels to one side increases the tension of one spring and decreases the tension of the other, so that an easily regulatable force is set up tending to draw the wheels to normal position.

It will be seen that I attain these results without altering any parts of the motor car and by the addition of a minimum number of parts.

What I claim as my invention is:

1. The combination with the front axle and steering spindles of a motor-vehicle of steering arms having threaded ends extending through the steering spindles; short arms provided with threaded holes screwed on to the ends of the steering arms and extending forwardly from the spindles; cylinders adapted to contain springs; clips securing the inner ends of the cylinders to said axle; plunger rods extending through the ends of the cylinders and pivotally connected to the aforesaid arms against their outer sides; coil springs placed on said plunger rods within the cylinders engaging the ends of the cylinders and washers secured on the said rods.

2. The combination with the front axle and steering spindles of a motor-vehicle of steering arms having threaded ends extending through the steering spindles; short arms provided with threaded holes screwed on to the ends of the steering arms and extending forwardly from the spindles; a threaded stud formed on the forward end of each short arm; a clip provided with a hole slipped onto said stud and having a curved end forming a loop behind the short arm; a nut threaded on said stud to hold the clip in place; cylinders adapted to contain springs; clips securing the inner ends of the cylinders to said axle; plunger rods extending through the ends of the cylinders and having looped ends embracing the short arms aforesaid and held in place by the loops of the clips; coil springs placed on said plunger rods within the cylinders engaging the ends of the cylinders and washers secured on the said rods.

Signed at Toronto this 21st day of Feb. A. D. 1919.

JONATHAN D. LOUDEN.